(12) United States Patent
Chen et al.

(10) Patent No.: US 11,893,479 B1
(45) Date of Patent: Feb. 6, 2024

(54) HADAMARD PRODUCT IMPLEMENTATION METHOD AND DEVICE, AND STORAGE MEDIUM

(71) Applicant: INSPUR SUZHOU INTELLIGENT TECHNOLOGY CO., LTD., Jiangsu (CN)

(72) Inventors: Jingjing Chen, Jiangsu (CN); Ruizhen Wu, Jiangsu (CN); Ping Huang, Jiangsu (CN); Lin Wang, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/267,431

(22) PCT Filed: Nov. 30, 2021

(86) PCT No.: PCT/CN2021/134194
§ 371 (c)(1),
(2) Date: Jun. 14, 2023

(87) PCT Pub. No.: WO2023/019799
PCT Pub. Date: Feb. 23, 2023

(30) Foreign Application Priority Data

Aug. 18, 2021 (CN) .......................... 202110945843.9

(51) Int. Cl.
*G06N 3/067* (2006.01)
(52) U.S. Cl.
CPC .................................... *G06N 3/067* (2013.01)
(58) Field of Classification Search
CPC ...... G06N 3/067; G06N 3/0675; G06N 3/044; G06N 3/08; G06N 3/084; G06N 3/045;
(Continued)

(56) References Cited

U.S. PATENT DOCUMENTS

| 8,027,587 B1* | 9/2011 | Watts ................. G02B 6/12007 359/107 |
| 2012/0062974 A1* | 3/2012 | Manipatruni ........... G02F 1/011 438/54 |
| 2015/0024507 A1* | 1/2015 | Han .................... G01N 33/5438 422/69 |
| 2015/0268420 A1* | 9/2015 | Feng ................. G02F 1/133611 385/50 |

(Continued)

FOREIGN PATENT DOCUMENTS

| CN | 108616686 A | 10/2018 |
| CN | 109639359 A | 4/2019 |

(Continued)

OTHER PUBLICATIONS

Bin, B. A., et al. "Joint for time of arrival and direction of arrival estimation algorithm based on the subspace of extended hadamard product." Acta Physica Sinica 64.7 (2015).

(Continued)

*Primary Examiner* — Collin X Beatty
(74) *Attorney, Agent, or Firm* — IPro, PLLC

(57) ABSTRACT

A method for realizing a Hadamard product, a device and a storage medium, includes: acquiring a plurality of to-be-treated optical signals with unequal wavelengths; inputting the to-be-treated optical signals into a wavelength division multiplexer; by using the wavelength division multiplexer, feeding the to-be-treated optical signals to a micro-ring-resonator component, wherein the micro-ring-resonator component includes a plurality of micro-ring-resonator groups each of which is formed by two micro-ring resonators with equal radii; and applying a corresponding electric current to the micro-ring-resonator component, to obtain a result of the Hadamard product according to an outputted light intensity.

17 Claims, 3 Drawing Sheets

(58) Field of Classification Search
CPC ...... G06N 3/047; G06N 3/0475; G06N 3/048;
G06N 3/065; G06N 20/10; G06N 20/00;
G06N 3/04; G06N 7/01; G06N 3/063;
G06N 3/082; G06E 1/045; G06E 3/008;
G06E 3/005; G06E 3/006; G06E 1/00;
G06E 3/001; G02F 1/225; G02F 1/212;
G02F 2203/50; G02F 1/00; G02F 1/025;
G02F 1/2257; G02F 3/024; G02F 1/035;
G02F 1/21; G02F 2203/15; G02F
2203/48; G02F 1/011; G02F 1/0121;
G02F 1/0147; G02F 1/0327; G02F
2201/16; G02F 2202/32; G02F 2203/58;
G02F 2203/70; G02F 3/00; G02F 1/0126;
G02F 1/3558; G02F 2/004; G02F 2/008;
G02F 2201/02; G02F 2201/122; G02F
2201/18; G02F 2201/30; G02F 2202/20;
G02F 2203/055; G02F 2203/585; G02F
3/02; G02F 7/00
USPC .................................................. 359/107, 108
See application file for complete search history.

(56) References Cited

U.S. PATENT DOCUMENTS

| 2020/0052792 | A1 | 2/2020 | Yamamoto et al. |
| 2021/0264241 | A1* | 8/2021 | Karanth ................. G06N 3/045 |
| 2023/0152667 | A1* | 5/2023 | Miscuglio ............... G06E 3/003 |
| | | | 359/107 |
| 2023/0324607 | A1* | 10/2023 | Buddhiraju .......... G06N 3/0675 |
| | | | 385/14 |

FOREIGN PATENT DOCUMENTS

| CN | 109792297 A | 5/2019 |
| CN | 113031161 A | 6/2021 |
| CN | 113392965 A | 9/2021 |

OTHER PUBLICATIONS

Hong, Chen, et al. "Identity-based Matrix (level) fully homomorphic encryption scheme." Journal of Frontiers of Computer Science and Technology 14.10 (2020): 1702.

* cited by examiner

HADAMARD PRODUCT IMPLEMENTATION METHOD AND DEVICE, AND STORAGE MEDIUM

The present application claims the priority of the Chinese patent application filed on Aug. 18, 2021 before the Chinese Patent Office with the application number of 202110945843.9 and the title of "HADAMARD PRODUCT IMPLEMENTATION METHOD AND DEVICE, AND STORAGE MEDIUM", which is incorporated herein in its entirety by reference.

TECHNICAL FIELD

The present application relates to the technical field of photoelectric chips, and particularly relates to a method for realizing a Hadamard product, a device and a storage medium.

BACKGROUND

Chips are the base and core of the modern electronic information industry. With the globalization and high-speed development of technology, the data volume required to be processed is sharply increasing, and the corresponding data processing models and algorithms are also continuously increasing, the result of which is the increasingly higher requirements on the calculation power and the power consumption. Photon calculation chips, by using photons as the information carrier, have the advantages of high-speed concurrency and a low power consumption, and thus is considered as the most promising solution for high-speed, high-data-volume and artificial intelligence calculation and processing in the future.

Currently, the most commonly-used industrial solution of Optical Neural Networks (ONN) is to install exclusive devices. However, usually it is only suitable to solve the part of the multiplication and addition operation based on convolution operation. In Artificial Neural Networks (ANN), although the operation having the maximum volume is from the convolution operation, in networks such as Long Short-Term Memory (LSTM) artificial neural network, there also exists a large amount of operation of the Hadamard product.

SUMMARY

In view of the above, a purpose of the present application is to provide a method for realizing a Hadamard product, a device and a storage medium, which can utilize a micro-ring-resonator component to realize a simulated solution suitable for the Hadamard product in the optical neural network. The particular solutions are as follows:

A method for realizing a Hadamard product, comprising:

acquiring a plurality of to-be-treated optical signals with unequal wavelengths;

inputting the to-be-treated optical signals into a wavelength division multiplexer;

by using the wavelength division multiplexer, feeding the to-be-treated optical signals to a micro-ring-resonator component, wherein the micro-ring-resonator component comprises a plurality of micro-ring-resonator groups each of which is formed by two micro-ring resonators with equal radii; and applying a corresponding electric current to the micro-ring-resonator component, to obtain a result of the Hadamard product according to an outputted light intensity.

In some embodiments, in the method for realizing a Hadamard product according to an embodiment of the present application, the radii of the micro-ring-resonator groups are unequal.

In some embodiments, in the method for realizing a Hadamard product according to an embodiment of the present application, the wavelengths of the to-be-treated optical signals correspond to the radii of the micro-ring-resonator groups one to one; and a quantity of the wavelengths of the to-be-treated optical signals is equal to a quantity of the micro-ring-resonator groups.

In some embodiments, in the method for realizing a Hadamard product according to an embodiment of the present application, each of the micro-ring resonators comprises one straight waveguide and one micro-ring waveguide.

In some embodiments, in the method for realizing a Hadamard product according to an embodiment of the present application, the straight waveguides of all of the micro-ring resonators of the micro-ring-resonator component are a same one shared straight waveguide; and the shared straight waveguide has an input port and a direct-passing port.

In some embodiments, in the method for realizing a Hadamard product according to an embodiment of the present application, the radii of the micro-ring-resonator groups increase sequentially in a direction from the input port to the direct-passing port.

In some embodiments, in the method for realizing a Hadamard product according to an embodiment of the present application, a transfer function between a light intensity at the direct-passing port and a light intensity at the input port is between 0 and 1.

In some embodiments, in the method for realizing a Hadamard product according to an embodiment of the present application, simultaneously with the step of applying the corresponding electric current to the micro-ring-resonator component, the method further comprises:

controlling the transfer function between the light intensity at the direct-passing port and the light intensity at the input port to reach a target transfer function.

An embodiment of the present application further provides a device for realizing a Hadamard product, wherein the device comprises a processor and a memory, and the processor, when executing a computer program stored in the memory, implements the above method for realizing a Hadamard product according to the embodiments of the present application.

An embodiment of the present application further provides a computer-readable storage medium, wherein the computer-readable storage medium is configured for storing a computer program, and the computer program, when executed by a processor, implements the above method for realizing a Hadamard product according to the embodiments of the present application.

It can be seen from the above technical solutions that the method for realizing a Hadamard product according to the present application comprises: acquiring a plurality of to-be-treated optical signals with unequal wavelengths; inputting the to-be-treated optical signals into a wavelength division multiplexer; by using the wavelength division multiplexer, feeding the to-be-treated optical signals to a micro-ring-resonator component, wherein the micro-ring-resonator component comprises a plurality of micro-ring-resonator groups each of which is formed by two micro-ring resonators with equal radii; and applying a corresponding electric current to the micro-ring-resonator component, to obtain a result of the Hadamard product according to an outputted light intensity.

In the present application, by using the micro-ring resonators as the base for realizing the solution of an artificial neural network, using the wavelength division multiplexer to feed the to-be-treated optical signals to the micro-ring-resonator component, and heating by using the electric current, the effective refractive indexes and the phases of the micro-ring resonators can be changed, and the result of the Hadamard product can be obtained according to the light intensity of the outputted optical signal, thereby realizing a simulated solution suitable for the Hadamard product in the optical neural network. Furthermore, the present application further provides the device and the computer-readable storage medium corresponding to the method for realizing a Hadamard product, which further enables the method to have more practical applicability, and the device and the computer-readable storage medium have the corresponding advantages.

BRIEF DESCRIPTION OF THE DRAWINGS

In order to more clearly illustrate the technical solutions of the embodiments of the present application or the related art, the figures that are required to describe the embodiments or the related art will be briefly described below. Apparently, the figures that are described below are merely embodiments of the present application, and a person skilled in the art can obtain other figures according to the provided figures without paying creative work.

DETAILED DESCRIPTION

The technical solutions of the embodiments of the present application will be clearly and completely described below with reference to the drawings of the embodiments of the present application. Apparently, the described embodiments are merely certain embodiments of the present application, rather than all of the embodiments. All of the other embodiments that a person skilled in the art obtains on the basis of the embodiments of the present application without paying creative work fall within the protection scope of the present application.

Figure 1:
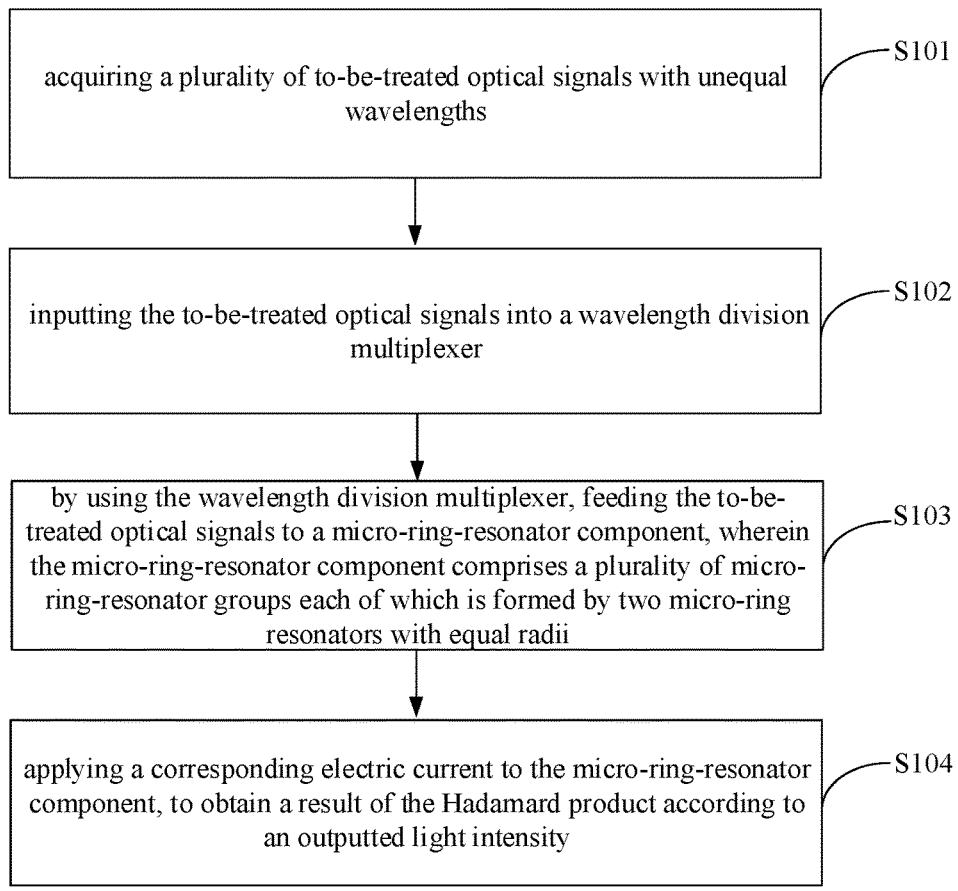
FIG. 1 is a flow chart of a method for realizing a Hadamard product according to an embodiment of the present application.

The present application provides a method for realizing a Hadamard product. As shown in FIG. 1, the method comprises the following steps:

S101: acquiring a plurality of to-be-treated optical signals with unequal wavelengths;

S102: inputting the to-be-treated optical signals into a wavelength division multiplexer (Wavelength Division Multiplexing, WDM);

S103: by using the wavelength division multiplexer, feeding the to-be-treated optical signals to a micro-ring-resonator component, wherein the micro-ring-resonator component comprises a plurality of micro-ring-resonator groups each of which is formed by two micro-ring resonators with equal radii; and S104: applying a corresponding electric current to the micro-ring-resonator component, to obtain a result of the Hadamard product according to an outputted light intensity.

In the method for realizing a Hadamard product according to an embodiment of the present application, by using the micro-ring resonators as the base for realizing the solution of an artificial neural network, using the wavelength division multiplexer to feed the to-be-treated optical signals to the micro-ring-resonator component, and heating by using the electric current, the effective refractive indexes and the phases of the micro-ring resonators can be changed, and the result of the Hadamard product can be obtained according to the light intensity of the outputted optical signal, thereby realizing a simulated solution suitable for the Hadamard product in the optical neural network.

It should be noted that the Hadamard product is a matrix operation. It is defined that A, B $\in C^{m \times n}$, and A=$[a_{ij}]$ and B=$[b_{ij}]$, and the Hadamard product between A and B is expressed as A∘B. The calculation mode is as follows:

$$A \circ B = \begin{bmatrix} a_{11} & a_{12} & \dots & a_{1n} \\ a_{21} & a_{22} & \dots & a_{2n} \\ \vdots & \vdots & & \vdots \\ a_{m1} & a_{m2} & \dots & a_{mn} \end{bmatrix} \circ \begin{bmatrix} b_{11} & b_{12} & \dots & b_{1n} \\ b_{21} & b_{22} & \dots & b_{2n} \\ \vdots & \vdots & & \vdots \\ b_{m1} & b_{m2} & \dots & b_{mn} \end{bmatrix} = \begin{bmatrix} a_{11}b_{11} & a_{12}b_{12} & \dots & a_{1n}b_{1n} \\ a_{21}b_{21} & a_{22}b_{21} & \dots & a_{2n}b_{2n} \\ \vdots & \vdots & & \vdots \\ a_{m1}b_{m1} & a_{m2}b_{m2} & \dots & a_{mn}b_{mn} \end{bmatrix} \quad (1)$$

The operation of the Hadamard product refers to multiplying the elements at the corresponding positions of two matrixes of the same order.

Figure 2:
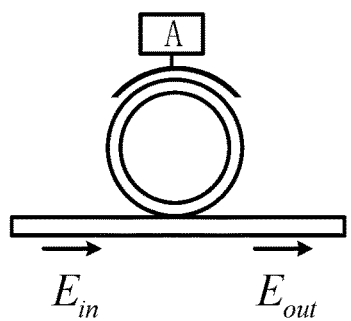
FIG. 2 is a schematic diagram of the result of micro-ring resonators according to an embodiment of the present application.
Figure 3:
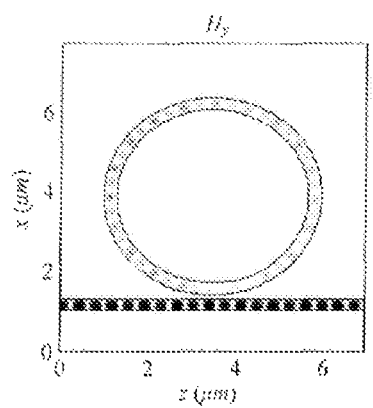
FIG. 3 is a light-intensity distribution diagram of the micro-ring resonators in a disresonance situation according to an embodiment of the present application.
Figure 4:
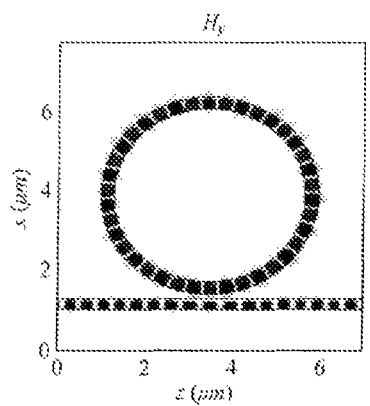
FIG. 4 is a light-intensity distribution diagram of the micro-ring resonators in a resonance situation according to an embodiment of the present application.

In some embodiments, in a particular embodiment, in the method for realizing a Hadamard product according to an embodiment of the present application, as shown in FIG. 2, each of the micro-ring resonators MRR may comprise one straight waveguide and one micro-ring waveguide. Preferably, the MRRs are silicon-based MRRs of the All-pass type. FIGS. 3 and 4 show the light-intensity distribution diagrams of the All-pass-type MRRs in the disresonance and resonance situations respectively. The optical signal enters from the inputting end. If the wavelength of the incident light satisfies the resonance condition, most of the optical signal with that wavelength is restrained in the micro ring, and the outputting end has almost no output. If the resonance condition is not satisfied, the optical signal entering the micro ring has destructive interference, and the inputted optical waves are outputted directly from the direct-passing end. Therefore, the micro rings have the most basic function of filtering.

When light is being transmitted in the micro ring, it is restrained strongly by the micro ring. When it satisfies the condition that the optical path difference generated when it is transmitted around the micro ring by one round is an integral multiple m of the wavelength of the optical signal, resonance happens, and the intensity of the optical signal continuously increases. The condition that enables it to have interaction and be intensified is referred to as the resonance condition. The resonance equation of the micro ring is:

$$2\pi R n_{eff} = m\lambda_i \quad (2)$$

wherein $\lambda_i$ is the wavelength of the optical signal, m is an integral multiple of the wavelength of the optical signal, R is the radius of the MRR, and $n_{eff}$ is the effective refractive index of the light. The light with the wavelength satisfying the formula (2) satisfies the resonance condition, and is restrained in the micro ring. It can be known from the resonance equation (2) that the unequal wavelengths correspond to unequal micro-ring radii. When an electric current passes through the MRR, the MRR is heated, which results in the changing of the effective refractive index $n_{eff}$ of the light, to cause the resonance wavelength to drift, whereby part of the light restrained in the micro ring is outputted from the direct-passing end.

The expression of the transfer function of the intensity of the light exiting from the through hole at the direct-passing end and the intensity of the light entering the input port of the all-pass resonator MRR is as follows:

$$T_n(\phi_i) = \frac{a^2 - 2ra\cos(\phi_i) + r^2}{1 - 2ra\cos(\phi_i) + (ar)^2} \quad (3)$$

wherein $\phi_i$ is the phase of the MRR, r is a self-coupling coefficient, and a defines the propagation loss of the ring and a directional coupler. The value range of the transfer function is [0,1].

If the amplitude of the inputted optical signal is $E_{in}$ (the light intensity is $|E_{in}|^2$), then the light intensity outputted from the MRR is:

$$|E_{out}|^2 = T_n(\phi_i)|E_{in}|^2 \quad (4)$$

The expression of the phase $\phi_i$ in the formula (1) is:

$$\phi_i = \frac{4\pi^2 \cdot R \cdot n_{eff}}{\lambda} \quad (5)$$

Figure 5:
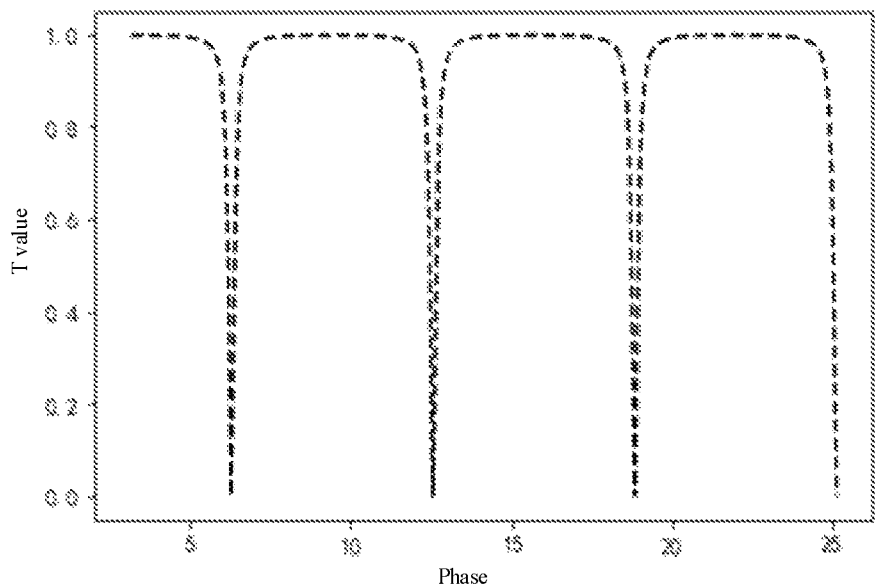
FIG. 5 is a schematic diagram of the variation of the transfer functions of the micro-ring resonators with the phases according to an embodiment of the present application.

FIG. 5 shows a diagram of the variation of the transfer function $T_n(\phi_i)$ of the All-pass micro ring with the phase $\phi_i$.

When an electric current passes through the silicon-based MRR, the MRR is heated, which results in the changing of $n_{eff}$, which results in the changing of the phase $\phi_i$, and finally influences the transfer function of the light intensity $T_n(\phi_i)$. In other words, if the amplitude of the inputted optical signal is $E_{in}$ (the light intensity is $|E_{in}|^2$), by applying electric-current heating to the silicon-based micro ring, the transfer function $T_n(\phi_i)$ is changed, thereby obtaining the wanted outputted light intensity $|E_{out}|^2$. The present application realizes the calculation of the Hadamard product according to such a property of the silicon-based MRR.

In a particular embodiment, in the method for realizing a Hadamard product according to an embodiment of the present application, the radii of the micro-ring-resonator groups are unequal. Preferably, the wavelengths of the to-be-treated optical signals correspond to the radii of the micro-ring-resonator groups one to one; and the quantity of the wavelengths of the to-be-treated optical signals is equal to the quantity of the micro-ring-resonator groups.

In the following, taking $A=[a_1 \ a_2 \ a_3]$ and $B=[b_1 \ b_2 \ b_3]$ as an example, according to the definition, the Hadamard product between A and B is:

$$A \circ B = [a_1 b_1 \ a_2 b_2 \ a_3 b_3] \quad (6)$$

Figure 6:
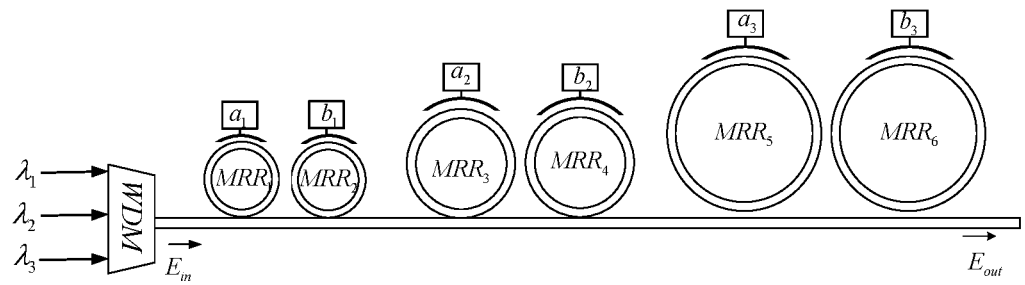
FIG. 6 is a schematic structural diagram of a device for realizing a Hadamard product by using a wavelength division multiplexer and a micro-ring-resonator component according to an embodiment of the present application.

The present application realizes the calculation of the Hadamard product according to the property of the silicon-based MRR and the WDM. As shown in FIG. 6, FIG. 6 contains six MRRs, every two of which are one group of the equal radius, and the radii are $R_1$, $R_2$ and $R_3$.

In a particular embodiment, the straight waveguides of all of the MRRs of the MRR component may be the same one shared straight waveguide. The shared straight waveguide has an input port and a direct-passing port. The transfer function between the light intensity at the direct-passing port and the light intensity at the input port is between 0 and 1.

As shown in FIG. 6, the laser emits optical signals with the wavelengths of $\lambda_1$, $\lambda_2$ and $\lambda_3$, and in order to facilitate the comprehension, it is assumed that all of the light intensities of the three optical signals are 1. Subsequently, they are fed to the MRR component via the WDM. The MRR component is formed by three MRR groups with unequal radii. The radii are $R_1$, $R_2$ and $R_3$. The radii may increase sequentially in the direction from the input port to the direct-passing port, and satisfy:

$$2\pi R_i n_{eff} = m\lambda_i \ i=1,2,3 \quad (7)$$

It can be known from the formula (5) and the formula (7) that, if the MRRs are not heated, then all of the three optical signals with the wavelengths of $\lambda_1$, $\lambda_2$ and $\lambda_3$ are restrained in the micro rings, and no optical signal is outputted at the direct-passing end. If the micro rings are individually applied with electric currents, the micro rings are heated, which results in the variation of $n_{eff}$, whereby the variation of the phase $\phi_i$ satisfies:

$T_{MMR_1}(\phi_1)=a_1$, $T_{MRR_2}(\phi_2)=b_1$
$T_{MRR_3}(\phi_3)=a_2$, $T_{MRR_4}(\phi_4)=b_2$
$T_{MRR_5}(\phi_5)=a_3$, $T_{MRR_6}(\phi_6)=b_3$ In this case, the light intensities of the optical signals of $\lambda_1$, $\lambda_2$ and $\lambda_3$ passing through the direct-passing end are $T_{MRR_1}(\phi_1)T_{MRR_2}(\phi_2)$, $T_{MRR_3}(\phi_3)T_{MRR_4}(\phi_4)$, and $T_{MRR_5}(\phi_5)T_{MRR_6}(\phi_6)$ respectively, i.e., $a_1 b_1, a_2 b_2, a_3 b_3$, which is the result of the Hadamard product between A and B.

In some embodiments, in a particular embodiment, in the method for realizing a Hadamard product according to an embodiment of the present application, simultaneously with the step of applying the corresponding electric current to the micro-ring-resonator component, the method further comprises: controlling the transfer function between the light intensity at the direct-passing port and the light intensity at the input port to reach a target transfer function. Accordingly, by controlling the transfer function of the MRR component to be the target transfer function, it can be ensured that the magnitude of the applied electric current can accurately obtain the result of the required Hadamard product.

Correspondingly, an embodiment of the present application further discloses a device for realizing a Hadamard product, wherein the device comprises a processor and a memory, and the processor, when executing a computer program stored in the memory, implements the method for realizing a Hadamard product according to the above embodiments.

The more particular process of the above-described method may refer to the corresponding contents disclosed in the above embodiments, which is not discussed further herein.

In some embodiments, the present application further discloses a computer-readable storage medium, wherein the computer-readable storage medium is configured for storing a computer program, and the computer program, when executed by a processor, implements the method for realizing a Hadamard product according to the above embodiments.

The more particular process of the above-described method may refer to the corresponding contents disclosed in the above embodiments, which is not discussed further herein.

The embodiments of the description are described in the mode of progression, each of the embodiments emphatically describes the differences from the other embodiments, and the same or similar parts of the embodiments may refer to each other. Regarding the device and the storage medium according to the embodiments, because they correspond to the methods according to the embodiments, they are described simply, and the relevant parts may refer to the description on the methods.

A person skilled in the art can further understand that the units and the algorithm steps of the examples described with reference to the embodiments disclosed herein may be implemented by using electronic hardware, computer software or a combination thereof. In order to clearly explain the interchangeability between the hardware and the software, the above description has described generally the configurations and the steps of the examples according to the functions. Whether those functions are executed by hardware or software depends on the particular applications and the design constraints of the technical solutions. A person skilled in the art may employ different methods to implement the described functions with respect to each of the particular applications, but the implementations should not be considered as extending beyond the scope of the present application.

Each of devices according to the embodiments of the disclosure can be implemented by hardware, or implemented by software modules operating on one or more processors, or implemented by the combination thereof. A person skilled in the art should understand that, in practice, a microprocessor or a digital signal processor (DSP) may be used to realize some or all of the functions of some or all of the modules in the device according to the embodiments of the disclosure. The disclosure may further be implemented as device program (for example, computer program and computer program product) for executing some or all of the methods as described herein. Such program for implementing the disclosure may be stored in the computer readable medium, or have a form of one or more signals. Such a signal may be downloaded from the internet websites, or be provided in carrier, or be provided in other manners.

Figure 7:
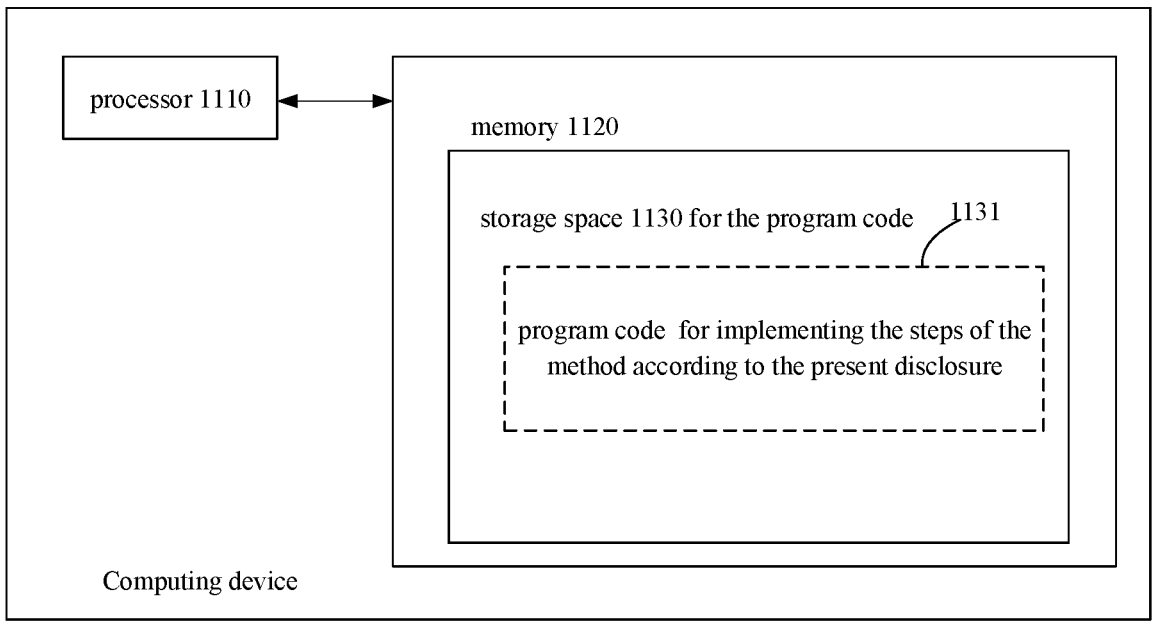
FIG. 7 is a block diagram showing a computing device for realizing a Hadamard product according the disclosure.
Figure 8:
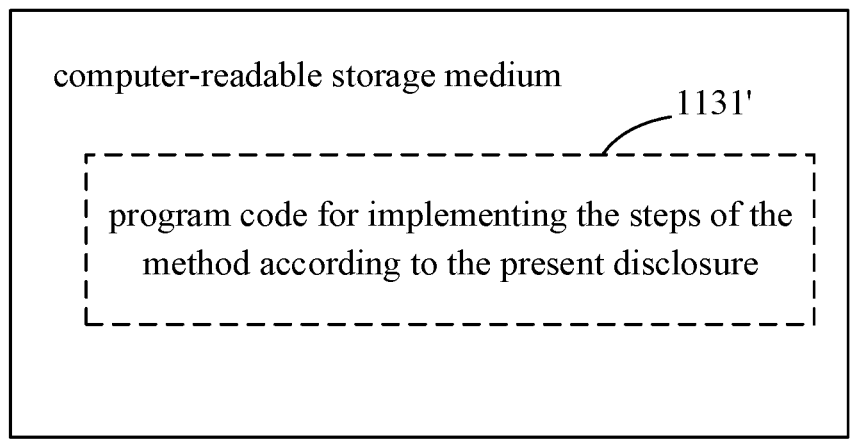
FIG. 8 is a block diagram showing storage unit for storing the program code for implementing the steps of the method according to the present disclosure.

For example, FIG. 7 illustrates a block diagram of a computing device for executing the method according the disclosure. Traditionally, the computing device includes a processor 1110 and a computer program product or a computer readable medium in form of a memory 1120. The memory 1120 could be electronic memories such as flash memory, EEPROM (Electrically Erasable Programmable Read-Only Memory), EPROM, hard disk or ROM. The memory 1120 has a memory space 1130 for executing program codes 1131 of any steps in the above methods. For example, the memory space 1130 for program codes may include respective program codes 1131 for implementing the respective steps in the method as mentioned above. These program codes may be read from and/or be written into one or more computer program products. These computer program products include program code carriers such as hard disk, compact disk (CD), memory card or floppy disk. These computer program products are usually the portable or stable memory cells as shown in reference FIG. 8. The memory cells may be provided with memory sections, memory spaces, etc., similar to the memory 1120 of the server as shown in FIG. 7. The program codes may be compressed for example in an appropriate form. Usually, the memory cell includes computer readable codes 1131' which can be read for example by processors 1110. When these codes are operated on the server, the server may execute respective steps in the method as described above.

The steps of the method or algorithm described with reference to the embodiments disclosed herein may be implemented directly by using hardware, a software module executed by a processor or a combination thereof. The software module may be embedded in a Random Access Memory (RAM), an internal memory, a read-only memory (ROM), an electrically programmable ROM, an electrically erasable programmable ROM, a register, a hard disk, a removable disk, a CD-ROM, or a storage medium in any other form well known in the art.

In conclusion, the method for realizing a Hadamard product according to the embodiments of the present application comprises: acquiring a plurality of to-be-treated optical signals with unequal wavelengths; inputting the to-be-treated optical signals into a wavelength division multiplexer; by using the wavelength division multiplexer, feeding the to-be-treated optical signals to a micro-ring-resonator component, wherein the micro-ring-resonator component comprises a plurality of micro-ring-resonator groups each of which is formed by two micro-ring resonators with equal radii; and applying a corresponding electric current to the micro-ring-resonator component, to obtain a result of the Hadamard product according to an outputted light intensity. Accordingly, by using the micro-ring resonators as the base for realizing the solution of an artificial neural network, using the wavelength division multiplexer to feed the to-be-treated optical signals to the micro-ring-resonator component, and heating by using the electric current, the effective refractive indexes and the phases of the micro-ring resonators can be changed, and the result of the Hadamard product can be obtained according to the light intensity of the outputted optical signal, thereby realizing a simulated solution suitable for the Hadamard product in the optical neural network. Furthermore, the present application further provides the device and the computer-readable storage medium corresponding to the method for realizing a Hadamard product, which further enables the method to have more practical applicability, and the device and the computer-readable storage medium have the corresponding advantages.

Finally, it should also be noted that, in the present text, relation terms such as first and second are merely intended to distinguish one entity or operation from another entity or operation, and that does not necessarily require or imply that those entities or operations have therebetween any such actual relation or order. Furthermore, the terms "include", "comprise" or any variants thereof are intended to cover non-exclusive inclusions, so that processes, methods, articles or devices that include a series of elements do not only include those elements, but also include other elements that are not explicitly listed, or include the elements that are inherent to such processes, methods, articles or devices. Unless further limitation is set forth, an element defined by the wording "comprising a . . . " does not exclude additional same element in the process, method, article or device comprising the element.

The method for realizing a Hadamard product, the device and the storage medium according to the present application have been described in detail above. The principle and the embodiments of the present application are described herein with reference to the particular examples, and the description of the above embodiments is merely intended to facilitate to comprehend the method according to the present application and its core concept. Moreover, for a person skilled in the art, according to the concept of the present application, the particular embodiments and the range of application may be varied. In conclusion, the contents of the description should not be understood as limiting the present application.

The invention claimed is:

1. A method for realizing a Hadamard product, comprising:
acquiring a plurality of to-be-treated optical signals with unequal wavelengths;
inputting the to-be-treated optical signals into a wavelength division multiplexer;
by using the wavelength division multiplexer, feeding the to-be-treated optical signals to a micro-ring-resonator component, wherein the micro-ring-resonator component comprises a plurality of micro-ring-resonator groups each of which is formed by two micro-ring resonators with equal radii; and
applying a corresponding electric current to the micro-ring-resonator component, to obtain a result of the Hadamard product according to an outputted light intensity;
wherein the radii of the micro-ring-resonator groups are unequal.

2. The method for realizing a Hadamard product according to claim 1, wherein the wavelengths of the to-be-treated optical signals correspond to the radii of the micro-ring-resonator groups one to one; and a quantity of the wavelengths of the to-be-treated optical signals is equal to a quantity of the micro-ring-resonator groups.

3. The method for realizing a Hadamard product according to claim 2, wherein each of the micro-ring resonators comprises one straight waveguide and one micro-ring waveguide.

4. The method for realizing a Hadamard product according to claim 3, wherein the straight waveguides of all of the micro-ring resonators of the micro-ring-resonator component are a same one shared straight waveguide; and
the shared straight waveguide has an input port and a direct-passing port.

5. The method for realizing a Hadamard product according to claim 4, wherein the radii of the micro-ring-resonator groups increase sequentially in a direction from the input port to the direct-passing port.

6. The method for realizing a Hadamard product according to claim 5, wherein a transfer function between a light intensity at the direct-passing port and a light intensity at the input port is between 0 and 1.

7. The method for realizing a Hadamard product according to claim 6, wherein simultaneously with the step of applying the corresponding electric current to the micro-ring-resonator component, the method further comprises:
controlling the transfer function between the light intensity at the direct-passing port and the light intensity at the input port to reach a target transfer function.

8. A device for realizing a Hadamard product, wherein the device comprises a processor and a memory, and the processor, when executing a computer program stored in the memory, implements operations comprising:
acquiring a plurality of to-be-treated optical signals with unequal wavelengths;
inputting the to-be-treated optical signals into a wavelength division multiplexer;
by using the wavelength division multiplexer, feeding the to-be-treated optical signals to a micro-ring-resonator component, wherein the micro-ring-resonator component comprises a plurality of micro-ring-resonator groups each of which is formed by two micro-ring resonators with equal radii; and
applying a corresponding electric current to the micro-ring-resonator component, to obtain a result of the Hadamard product according to an outputted light intensity;
wherein the radii of the micro-ring-resonator groups are unequal.

9. A non-transitory computer-readable storage medium, wherein the non-transitory computer-readable storage medium is configured for storing a computer program, and the computer program, when executed by a processor, implements operations comprising:
acquiring a plurality of to-be-treated optical signals with unequal wavelengths;
inputting the to-be-treated optical signals into a wavelength division multiplexer;
by using the wavelength division multiplexer, feeding the to-be-treated optical signals to a micro-ring-resonator component, wherein the micro-ring-resonator component comprises a plurality of micro-ring-resonator groups each of which is formed by two micro-ring resonators with equal radii; and
applying a corresponding electric current to the micro-ring-resonator component, to obtain a result of the Hadamard product according to an outputted light intensity;
wherein the radii of the micro-ring-resonator groups are unequal.

10. The method for realizing a Hadamard product according to claim 1, wherein the micro-ring-resonator is a silicon-based micro-ring-resonator of an All-pass type.

11. The device for realizing a Hadamard product according to claim 8, wherein the wavelengths of the to-be-treated optical signals correspond to the radii of the micro-ring-resonator groups one to one; and a quantity of the wavelengths of the to-be-treated optical signals is equal to a quantity of the micro-ring-resonator groups.

12. The device for realizing a Hadamard product according to claim 11, wherein each of the micro-ring resonators comprises one straight waveguide and one micro-ring waveguide.

13. The device for realizing a Hadamard product according to claim 12, wherein the straight waveguides of all of the micro-ring resonators of the micro-ring-resonator component are a same one shared straight waveguide; and
the shared straight waveguide has an input port and a direct-passing port.

14. The device for realizing a Hadamard product according to claim 13, wherein the radii of the micro-ring-resonator groups increase sequentially in a direction from the input port to the direct-passing port.

15. The device for realizing a Hadamard product according to claim 14, wherein a transfer function between a light intensity at the direct-passing port and a light intensity at the input port is between 0 and 1.

16. The device for realizing a Hadamard product according to claim 15, wherein simultaneously with the step of applying the corresponding electric current to the micro-ring-resonator component, the method further comprises:
   controlling the transfer function between the light intensity at the direct-passing port and the light intensity at the input port to reach a target transfer function.

17. The computer-readable storage medium according to claim 9, wherein the wavelengths of the to-be-treated optical signals correspond to the radii of the micro-ring-resonator groups one to one; and a quantity of the wavelengths of the to-be-treated optical signals is equal to a quantity of the micro-ring-resonator groups.

* * * * *